United States Patent [19]

Schora, Jr. et al.

[11] 3,993,450

[45] Nov. 23, 1976

[54] ELECTRODE ASSEMBLY FOR A FLUIDIZED BED APPARATUS

[75] Inventors: Frank C. Schora, Jr., Palatine, Ill.; Charles W. Matthews, Pittsburgh, Pa.; Ted M. Knowlton, Hinsdale, Ill.

[73] Assignee: The United States of America as represented by the United States Energy Research and Development Administration, Washington, D.C.

[22] Filed: Feb. 19, 1975

[21] Appl. No.: 551,225

[52] U.S. Cl. ............................ 23/284; 13/23; 23/277 R; 48/65; 204/272; 219/288; 219/289; 219/292
[51] Int. Cl.² ............................ B01J 1/00; H05B 3/60
[58] Field of Search ............. 23/284, 277 R, 288 S, 23/288 J; 48/65; 204/289, 272, 222; 219/284, 288, 289, 292, 294; 13/6, 7, 23

[56] References Cited
UNITED STATES PATENTS

| | | | |
|---|---|---|---|
| 1,987,381 | 1/1935 | Twombly | 219/288 |
| 2,599,779 | 6/1952 | Rajtora | 13/23 |
| 2,904,609 | 9/1959 | Schjelderup et al. | 13/23 X |
| 2,948,587 | 8/1960 | Johnson et al. | 23/284 UX |
| 3,157,468 | 11/1964 | Kennedy et al. | 48/65 X |
| 3,497,674 | 2/1970 | Zirngibl et al. | 23/284 UX |
| 3,499,947 | 3/1970 | Johnson | 23/288 S X |

*Primary Examiner*—Morris O. Wolk
*Assistant Examiner*—Arnold Turk
*Attorney, Agent, or Firm*—Dean E. Carlson

[57] ABSTRACT

An electrode assembly comprising a high voltage electrode having a generally cylindrical shape and being electrically connected to a high voltage source, where the cylinder walls may be open to flow of fluids and solids; an electrically grounded support electrode supporting said high voltage electrode by an electrically insulating support where both of the electrically grounded and electrically insulating support may be hollow; and an electrically grounded liner electrode arranged concentrically around both the high voltage and support electrodes. This assembly is specifically adapted for use in a fluidized bed chemical reactor as an improved heating means therefor.

9 Claims, 5 Drawing Figures

ELECTRODE ASSEMBLY FOR A FLUIDIZED BED APPARATUS

The present invention is applicable in the art of electrical heating, such as heating particle beds and especially to fluidized bed types of chemical reactors. The invention provides a special electrode assembly which is adapted to heat the particle bed in a fluidized reactor.

In the field of chemical processing, fluidized bed systems are very common and desirable for fluid-solid contact. In such systems, a prime use is for chemical reactors and therein the reaction zone is located in the bed of particles known as the packing of the bed. When a fluid is caused to flow upwardly through a vertical bed of particles, an expansion of the bed occurs by virtue of the particles being suspended in the flowing fluid. This phenomenon has been adapted to reactors by packing the bed of a reactor with one reactant and flowing, in fluid form, another reactant upwards therethrough in order to take advantage of the increased gas-solid surface area contact occurring in such systems.

In this system, the solid chemically reacts with the fluid and can be withdrawn continuously and replaced by new reactant.

As is generally found in chemical reactions, it is desirable to control the temperature of the reactants and in many cases heat will serve to catalyze the reaction. When the fluid is an electrical insulator and the solid is an electrical conductor, an efficient means of heating the reaction is provided. An electrical current can be passed from one location within the bed to another location within the bed thus heating the bed by the resistance the particles present to the flow of current through the bed. This type heating is especially desirable where the reactants must not be contaminated by external sources.

The most relevant known systems for electrically heating fluidized bed reactors have usually taken the form of a simple high voltage "rod-type" electrode positioned in the center of the bed to provide a source of high voltage current via electrical connectors passing through the reactor walls, and a "liner" electrode which lines the reactor walls and which is grounded. Such a system experienced many operational problems primarily in the non-uniform release of heat throughout the cross section of the bed (the areas adjacent the rod are hot spots), the short circuiting of the current flow through the bed when fluidization is stopped, the short circuiting across the electrical insulators, the requirement of several entry sites for electrical connectors and leads which weakens the integrity of the reactor and provides sources for contamination of reactants and escape of the fluids.

One variation of the basic concept is known to improve the heat distribution. It has been proposed to arrange a central high voltage electrode, insulated from the grounded wall of the chamber and surrounded by a grounded electrode; in that system, additional concentric cylindrical high voltage and grounded electrodes are alternately arranged across the bed cross-section. While this does improve the overall heat distribution in the bed, it multiplies the problem of hot spots and inhibits reactants flow.

Still other variations in electrode assemblies are known to the art, such as the use of cup shaped electrodes. However, none of these proposals avoid all the aforementioned deficiencies in the art of heating particle beds and reactors.

The present invention makes possible a more uniform heating of a particle bed by electrical resistance heating using the particles as conductor to transfer charge from particle to particle within the bed and to attain uniform heat release across the bed cross-section, to prevent short circuiting through the bed when the conducting fluid is absent, to avoid cracking and weakening of the bed chamber due to short circuiting across electrical insulators, to allow free flow of reactants, to limit the danger of contamination and leakage by providing a single penetration of the bed chamber for electrical connections, and to enable a high voltage electrode to be cooled, sealed, purged and temperature controlled by external devices.

These and other objects are attained by the use of the structure shown in the annexed drawings and described herein. Briefly, the structure according to the invention for use in reactors provides a three electrode assembly with a first cylindrical or umbrella electrode which serves as the high voltage electrode and which is positioned at the top of the bed whereby it is immersed when the bed is fluidized but not when fluid is absent; a second inner rod type electrode which supports but is insulated from the cylindrical electrode and which serves as a ground electrode; and a third concentric liner or enveloping electrode which is grounded to the walls of the bed chamber. The umbrella electrode can be connected to a source of current by leads passing through a hollow supporting ground electrode and a hollow insulating support. The umbrella shape and positioning adjacent the two ground electrodes provide lines of constant theoretical heat release across the bed rather than upwards through the bed.

As applied to the field of fluidized bed reactors, the invention provides an apparatus which comprises a closed reactor shell having a fluidizing means and a bed means adapted to contain a solid particle bed, and the electrical heating means as just described, there being possible a single penetration of the reactor shell for electrical connections.

The invention will be more fully understood by reference to the Figures where

In the Figures like numbers represent like elements.

Figure 1:
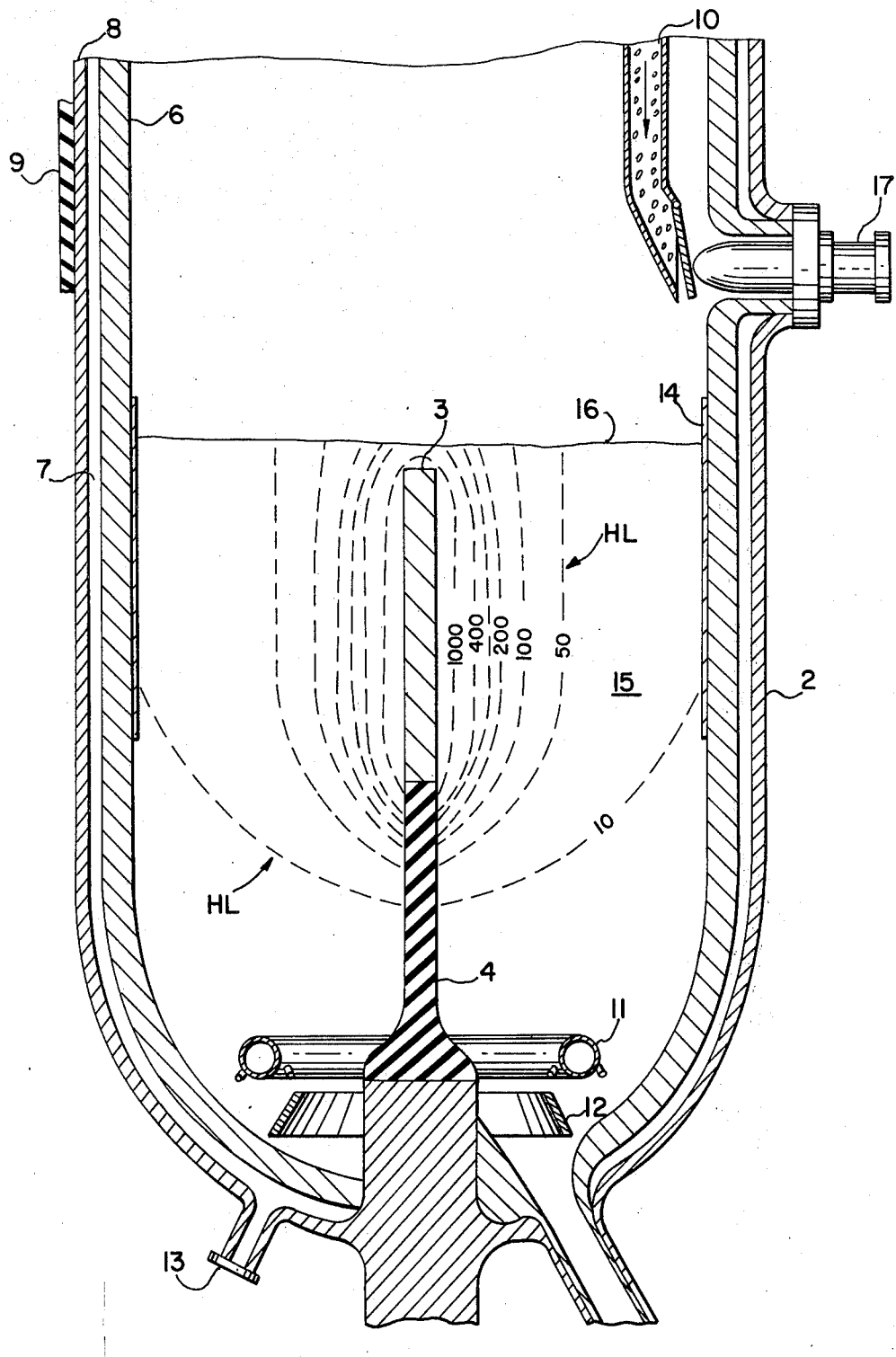
FIG. 1 represents a schematic sectional view of the basic prior art system illustrating that the lines of heat release travel generally vertically with a very hot region adjacent the high voltage electrode.

The invention will be illustrated, by way of non-limiting example, by considering its application to the electrothermal gasification method of producing hydrogen for use in coal gasification reactions. The primary applications of fluidized bed reactors today are in the catalytic cracking of petroleum and the gasification of coal. However, as previously mentioned, the apparatus is generally applicable in fluidized bed systems and especially in fluidized reactors.

In the gasification of coal, hydrogen and carbon monoxide are generated by the reaction of steam and coal char. This mixture of gases, which are reducing gases, finds utility in the production of pipeline quality fuel gas from coal (in other reaction zones). In the conversion of coal to a high-methane fuel gas, the gasification reactor is usually divided into more than one reaction zone. In an upper zone, coal devolatizes and reacts with hydrogen from the methane. Simultaneously, carbon monoxide which is present reacts with steam to form more hydrogen. Unreacted char from the upper zone is transferred to a higher temperature zone where it is contacted with steam and reacts forming hydrogen and carbon monoxide which are consumed in the upper reaction zones. This process may be conducted at temperatures from 1200° to 1900° F and at pressures from 200 to 1500 psia.

In this process when used for electrothermal gasification the formation of $H_2$ and CO occurs in the reactor. The chemical reactions occurring at about 1900° F and 1200 psia are:

| (1) | $C + H_2O \rightarrow CO + H_2$ | Main reaction. Requires heat. |
| (2) | $C + 2H_2 \rightarrow CH_4$ | Minor desirable reaction. Releases heat. |
| (3) | $CO + H_2O \rightarrow CO_2 + H_2$ | Minor desirable reaction. Releases heat. |

Reaction (1) is the primary reaction and has a large net heat requirement to support this reaction. In the reactor the heat is supplied by passing an electrical current through the bed of char which is fluidized by steam. A very large amount of electricity is required. In a gasification plant which produces 80,000,000 SCF/day of pipeline gas, 110MW of electrical power is consumed in the bed. When the reactor is 21 feet in diameter, the average electrical heat supplied is 106,000 Btu/hr-cu ft of fluidized bed for a total heat release of $375 \times 10^6$ Btu/hr.

In the electrode system a most desirable objective to attain is uniform heat release in the fluid bed which will reduce hot spots and which will insure maximum utilization of the fluid bed volume for the desired reactions to take place. Additional objectives are simplification of the reactor mechanical design and insurance that electrical failure in the system "fails safe" and avoids catastrophic vessel failure.

As with most pressure vessels, this reactor is designed as a vertical cylinder with appropriate heads to economically and safely contain the pressure. Because of the severe temperature and pressure conditions within the reactor, an acceptable design has been proposed wherein the external pressure containing shell is cooled by an internal boiling water jacket. The inner metal wall of the water jacket can be relatively thin alloy metal when the pressure of the water jacket is controlled to nearly the same pressure as within the reactor. The metal inner wall of the water jacket is protected by thick internal insulation. Even though this construction is complex, it is likely to be less costly than other designs because the thick pressure containing shell can be inexpensive carbon steel while the expensive alloy inner shell is thin because of the balanced pressure design. Furthermore, in case of failure of the internal insulation, the pressure containing shell will not weaken because it is protected by the water jacket.

In any case, with complex vessel construction, a minimum of vessel penetrations is most desirable.

The prior art electrode assembly used in this process is shown in FIG. 1. In such systems DC electricity is applied at a voltage of 12,500 to 13,000 volts and at an amperage of 8,400 to 8,800 amps. AC electricity of suitable frequency may be used.

The amount of current used is selected to provide the desired heat and it will be set by such factors as the sparking point, the power factor and breakdown factor of the reactants, the resistivity of the bed particles and the frequency of the current. Voltage should be sufficient to cause catalysis but should be under the arcing value of the system. The arcing value depends upon the breakdown factor of the reactants, especially the fluid, as is known to the art.

The vessel 2 has an ID of about 21 feet and a high voltage electrode 3, centered therein, of about 1 foot diameter. The vessel or reactor 2 is shown in part in FIG. 1 but the details not shown are readily known to those skilled in the art (e.g. entrainment and recovery means are usually in the upper areas of the vessel). In the section of reaction zones illustrated, the vessel wall consists of internal thermal insulation 6; a water jacket 7 with water feed means 13 and outlet means (not shown) which provides for temperature control; a pressure shell 8; and an external layer of thermal insulation 9. Solids feed means 10 with a control 17 and solids outlet means 12 with a control consisting of a shroud to quiet the solids at the exit are also provided. Intermediate the solids inlet and outlet is the particle bed (15–16). Fluid feed means is, in this case, an internal circular distributor 11 and the fluid exit path is shown by the arrows at the top of the vessel section illustrated. Exiting fluid treating means are, as mentioned, not shown.

The electrode assembly used therein is described as follows. Inside the vessel and centered therein is a high voltage electrode 3, embedded in the particles and connected to a high voltage source by connector means (not shown) which are typically high voltage cables. These connector means generally pass through the vessel shell. The electrode 3 is insulated from the shell by electrically insulating support 4 which is rigidly attached to the vessel wall. Inside the internal thermal insulation is mounted a ground electrode 14 which takes the form of a liner grounded to the vessel wall which is connected to ground.

During operation, heat generation is as shown by the dotted lines HL in the bed. These lines show lines of constant heat release per unit volume occurring in the bed and, as shown, they extend generally vertically throughout the bed producing high temperature areas around the electrode 3. Low temperature areas occur near the circumference of the bed, 15, where most of the particles are found. In operation, if a short circuit develops, e.g. by cutting off conducting fluid flow, a current path is established from the high voltage electrode 3 to the vessel wall 8 which, due to the high temperatures and voltages involved, will crack, melt or otherwise weaken the vessel and electrodes in a brief period.

Modifications of the prior art's structure can be made to reduce but not avoid the problems. Thus, increasing the diameter of electrode 3 from 1 to 5 feet reduces the hot spots around the electrode but not sufficiently to alleviate this problem, or to give uniform heat release in the bed. This modification also adds resistance to the flow of fluid and reduces the volume of the particle bed thereby creating new problems and disadvantages.

Figure 2:
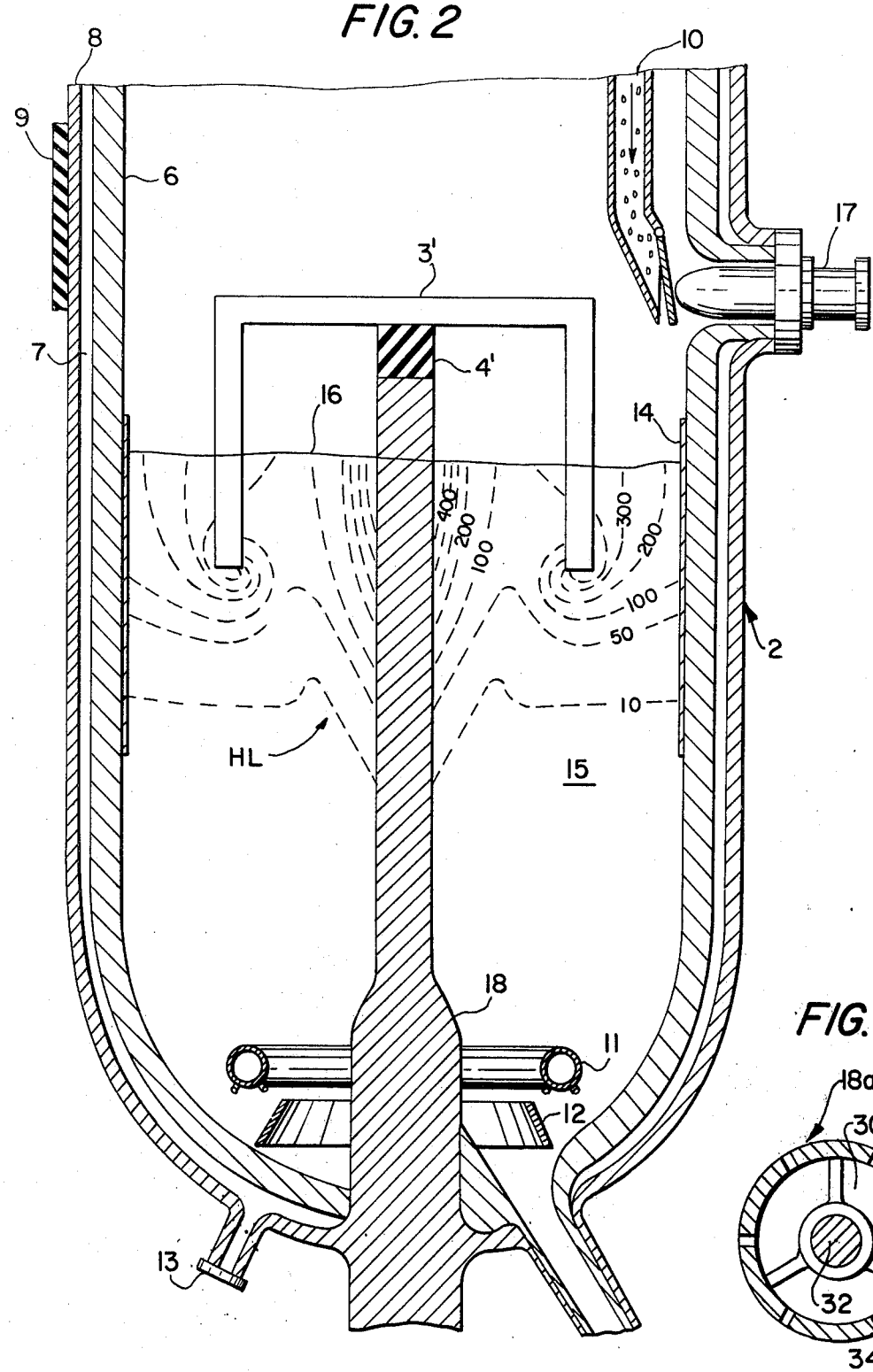
FIG. 2 represents a schematic sectional view of an assembly of three electrodes in a fluidized bed according to this invention and showing the lines of heat release extending generally transversely across the bed.

Referring to FIG. 2, the inventive electrode assembly is illustrated as applied to the reactor shown in FIG. 1. The basic distinctions are in the provision of a third "support" electrode 18, and another and different high voltage electrode 3' which is positioned differently.

Figure 3:
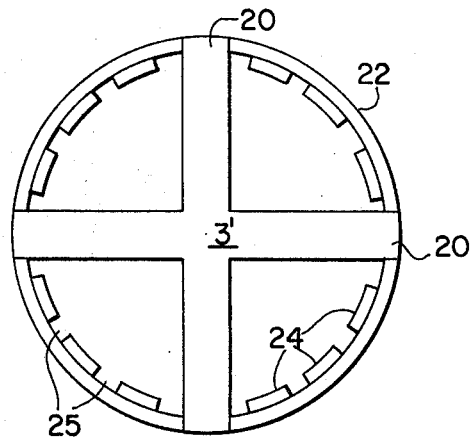
FIG. 3 is a top plan view of the umbrella electrode shown in FIG. 2.
Figure 4:
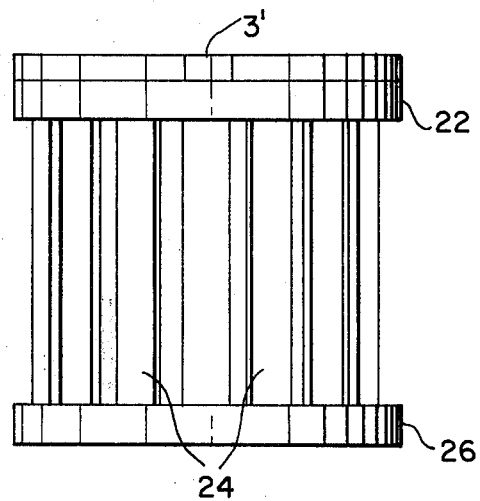
FIG. 4 is an elevation showing the electrode of FIG. 3.

In the system of FIG. 2, the high voltage electrode 3' may be considered based upon FIGS. 3 and 4. Those Figures show a detailed view of the preferred cylindrically shaped electrode for use in fluidized bed systems which is shown in cross-section only in FIG. 2. The electrode has a top consisting of bars 20, formed by crossing bars and joining them via a circular bar 22. Legs 24 depend from bar 22 providing spaces 25 that are open for fluid or particle flow. Legs 24 are joined at the bottom by a second circular bar 26. The bottom of the cylinder (not shown) is open so that the sectional area as shown in FIG. 2 is of umbrella configuration. The width of the bars, 20, 22, 24 and 26 as well as the diameter of the electrode can vary to vary the heat output. Increasing the bar width will generally release more heat. Increasing the diameter of this electrode generally results in more heat being introduced into the bed. The height of the electrode will be selected so that the electrode is immersed in the bed in its expanded, fluidized state but is free of the bed in its quiet state. The electrode will fit over the centrally located support electrode and extends below the electrically insulating support 4'.

As mentioned, the electrode 3' is mounted on a support insulator 4' which is rigidly connected to the new ground electrode 18. Electrode 18 is grounded to the vessel wall which is connected to ground wall and 18 is located inside the "cage" or cylindrical plane defined by electrode 3'. Both the support insulator 4' and the support electrode 18 are preferably hollow to accommodate electrical cables connecting high voltage electrode 3' to its voltage source and it is also possible to introduce the fluidizing medium such as steam or another inert gas through this hollow cavity in lieu of the distributor 11.

Figure 2A:
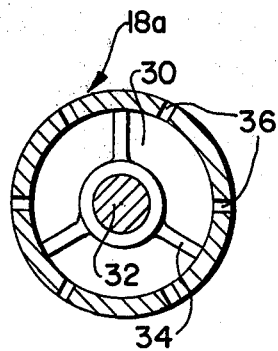
FIG. 2A is an alternate cross section of one of the electrodes shown in FIG. 2.

FIG. 2A illustrates an alternate cross section for the support electrode, shown as 18A, at an elevation suitable for introducing the gas. A central and longitudinal cavity 30 contains an electrical bar or cable 32 protected and supported by electrical insulation members 34. The gas passes through the central cavity 30 in the annulus between cable 32 and the walls of electrode 18A. Ports 36 are shown penetrating the electrode walls for introduction of gas into the reactor.

In the invented system, several advantages previously alluded to are realized. Primarily, better and safer heat distribution is accomplished. Current flow from the high voltage electrode 3' is toward the support electrode 18 and toward the outside concentric liner electrode 14. With this electrical path, the heat release pattern across the bed cross section is more even. With the excellent vertical heat transfer rates inherent in fluid beds, heat released in the upper part of the bed can be utilized throughout the vertical zone very rapidly. By directing the flow of current from the umbrella electrode both inward to the center electrode and outward to the external concentric electrode, more uniform heat release is obtained within the chemical reactor as shown by the HL lines. In addition, structural advantages are realized. By location of the high voltage electrode at the stated depth, upon defluidization of the bed, the bed level will fall below the electrode thus stopping current flow automatically and avoiding short circuits. Even if a short circuit develops, e.g. by failure of the insulating support 4', short circuiting between the high voltage electrode and the ground electrode is confined within the vessel and cannot affect the integrity of the vessel shell.

In the case where high voltage cables pass through the hollow support means, combined thermal and/or electrical insulation can be provided in the cavity to prevent heat and current flow from the cables to the grounded support means. When a fluid, e.g. the steam, is fed via this cavity it will help further insulate the cable, and will provide a further safety factor since if a leak develops at the only penetration point the inert fluid is leaked rather than the fluids within the reactor which fluids are often toxic or flammable.

For these reasons, utilizing the support electrode as an inlet for electrical connectors and/or fluidizing media will minimize the penetration of the vessel and in fact provide an inherently protected penetration.

Whenever an entry or penetration of a pressurized vessel is made sealing means (not shown) should be provided. When the hollow support electrode is utilized as the entry point, or an entry point, pressure sealing means can be provided external to the vessel (this may be in addition to or in lieu of the inherent seal resulting when fluid is fed at that point). This enables simple conventional pressure sealing means to be used since the means is not subjected to the extreme temperature, pressure, and current conditions experienced within the reactor.

It should be understood that the materials of construction and dimensions of the elements described form no part of this invention and may be suitably chosen based on known design criteria. Where an electrical conductor is needed, one of the known materials is carbon, e.g. coal and graphite and another is silicone carbide; where an electrical insulator is needed quartz, mica or ceramics are suitable materials; where thermal insulation is needed asbestos is suitable. The electrical connectors, electrical source, after-treating means and other incidentals are all equally available to the art-skilled. All of these matters may be determined by reference to standard chemical engineering works such as *Perry's Chemical Engineer's* Handbook (McGraw-Hill Publishers, New York), any edition.

Modifications of the described system as will occur to the art-skilled are also to be included within the scope of the herein described concept. It is especially emphasized that the invention is not limited to coal gasifications and further the optional and preferred embodiments, such as, the hollow support means and their use for fluid and cable inlets may not be required in such other applications. The "open" electrode may also not be required where flow of materials is not required.

Having described our invention in full, clear, and concise terms, we claim:

1. In a fluidized bed reactor apparatus which comprises a closed reactor vessel having a fluidizing means and a bed means adapted to contain a fluidized solid particle bed, an improved electrical heating means comprising an electrode assembly consisting of a high voltage electrode means positioned at the upper area of the bed and adapted, by positioning, to be free of particle contact when the bed is quiet but immersed in the bed when the bed is fluidized, said high voltage electrode having a generally hollow cylindrical shape with an opening at the bottom and being electrically connected to a high voltage source; an electrically grounded support electrode means connected to the vessel wall at the bottom thereof and arranged in the central portion of the particle bed, said support electrode means extending through said bottom opening into said hollow cylindrical shape to support said high voltage electrode means by electrically insulated means and being positioned within the cylindrical surface defined by said high voltage electrode means, and an electrically grounded liner electrode means arranged concentrically around and spaced from both said high voltage electrode means and from said support electrode means.

2. Apparatus according to claim 1 wherein the high voltage electrode walls are open to flow of fluids and solids.

3. Apparatus according to claim 1 wherein said high voltage electrode means comprises a generally cylindrical body formed by a top circular bar, a bottom circular bar, leg bars which extend between the top circular bar and bottom circular bar in spaced relationship with respect to each other around the circumferences of the circular bars, and top bars which extend across the top circular bar, all of said bars being formed of electrically conducting material, and a high voltage electrical source electrically connected to at least one of said bars.

4. Apparatus according to claim 1 wherein the said support electrode and the said electrically insulating means are hollow and wherein high voltage cables pass through the said hollow means to electrically connect the high voltage electrode to a voltage source.

5. Apparatus according to claim 4 wherein gas feed means also pass through the said hollow means and distribute gas to the reactor through said hollow means.

6. Apparatus according to claim 5 wherein a single penetration of the reaction vessel is provided and that is located at the support electrode means connection with the vessel wall.

7. An electrode assembly comprising a high voltage electrode means, said high voltage electrode means having a generally hollow cylindrical shape with an opening at the bottom and being electrically connected to a high voltage source; an electrically grounded support electrode means extending through said bottom opening into said hollow cylindrical shape and supporting said high voltage electrode by electrically insulated means, said support electrode means being positioned within the cylindrical surface defined by said high voltage electrode; and an electrically grounded liner electrode means arranged concentrically around and spaced from both said high voltage electrode means and from said support electrode means.

8. The assembly of claim 7 wherein the support electrode and the electrically insulated means are hollow and wherein high voltage cables pass therethrough to the cylindrical high voltage electrode means.

9. The assembly of claim 7 wherein the high voltage electrode walls are open to flow of fluidized solids.

* * * * *